United States Patent [19]

Dambre

[11] Patent Number: 5,003,924
[45] Date of Patent: Apr. 2, 1991

[54] EGG INCUBATION CARRIAGE FOR A VENTILATED INCUBATION ENCLOSURE

[75] Inventor: Pierre Dambre, Chalonnes-sur-Loire, France

[73] Assignee: Elevage Avicole de la Bohardiere, Saint-Laurent-de-la-Plaine, France

[21] Appl. No.: 498,840

[22] Filed: Mar. 26, 1990

Related U.S. Application Data

[63] Continuation-in-part of Ser. No. 262,455, Oct. 25, 1988, abandoned.

[30] Foreign Application Priority Data

Oct. 27, 1987 [FR] France ............................... 87 14847

[51] Int. Cl.$^5$ ............................................. A01K 41/06
[52] U.S. Cl. ........................................ 119/44; 119/43
[58] Field of Search .............................. 119/39, 43, 44

[56] References Cited

U.S. PATENT DOCUMENTS

| | | | |
|---|---|---|---|
| 1,722,973 | 7/1929 | Tiffany | 119/44 |
| 1,725,634 | 8/1929 | Hake | 119/44 |
| 2,170,789 | 8/1939 | Smith | 119/44 |
| 2,793,581 | 5/1957 | Cannon | 119/44 |
| 2,997,021 | 8/1961 | Bailey | 119/44 |
| 4,005,679 | 2/1977 | Pas | 119/44 |
| 4,512,285 | 4/1985 | McGehee | 119/44 |

Primary Examiner—John G. Weiss
Attorney, Agent, or Firm—Mason, Kolehmainen, Rathburn & Wyss

[57] ABSTRACT

An egg incubation carriage for a ventilated incubation enclosure, the carriage (10) having egg-receiving cradles (11) which are superposed in columns (13), said carriage including a plurality of juxtaposed columns, and the cradles of each column being tiltable in one direction or the other in alternation while remaining parallel with each other. The cradles in two adjacent columns are hinged to a common vertical riser (21), with the various risers being pivotally connected at their ends to a series of tiltable crossbars (29) which are pivotally connected to one another in series so as to form an assembly which is articulated at each link point of the crossbars to risers, and at each link point of the risers to cradles, with adjacent risers being capable of being displaced in alternation in opposite directions while remaining parallel to one another so as to fold up and spread out the articulated assembly, thereby tilting the cradles, with the cradles tilting in opposite directions in adjacent columns. As a result, the cradles can be tilted alternately in opposite directions without splitting up the columns which would establish empty passages between adjacent columns and interfere with proper ventilation of the mass of eggs.

4 Claims, 3 Drawing Sheets

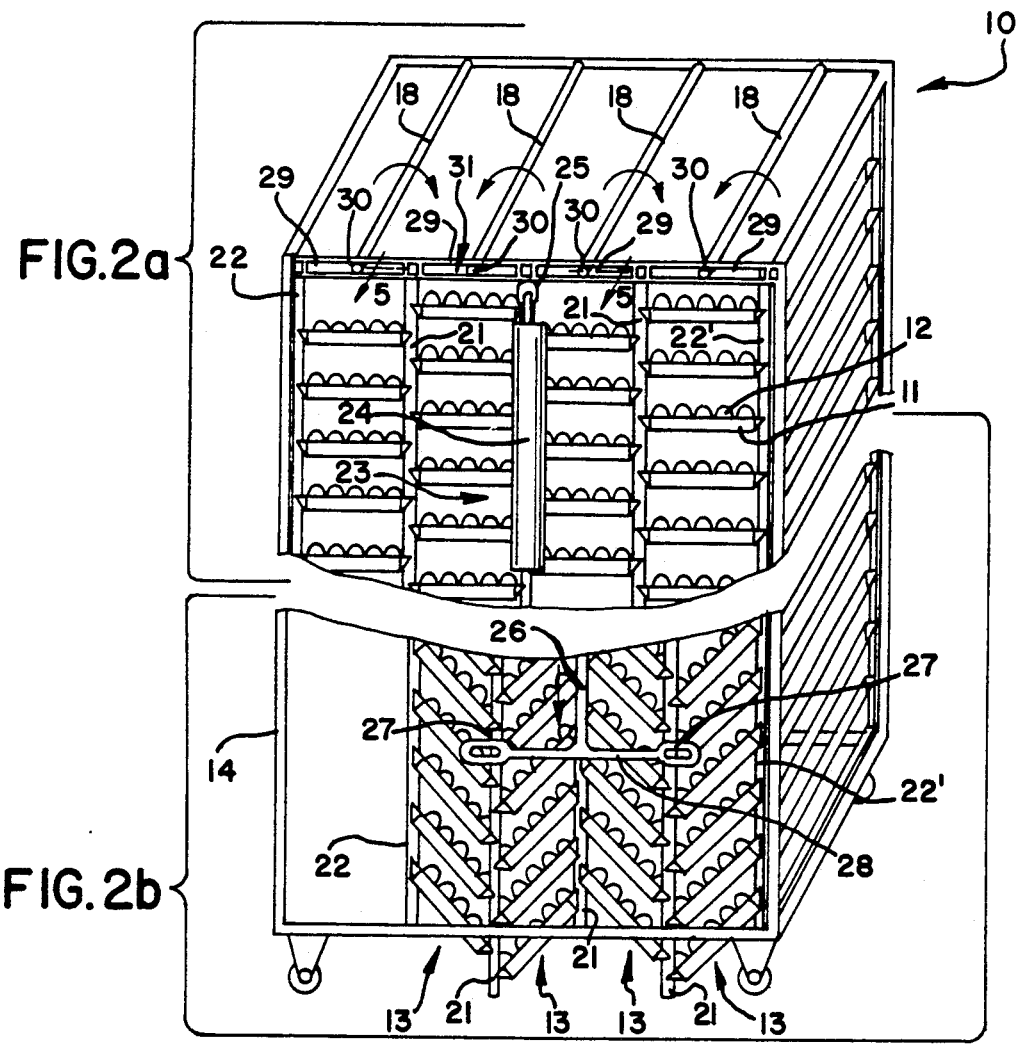
FIG.2a
FIG.2b
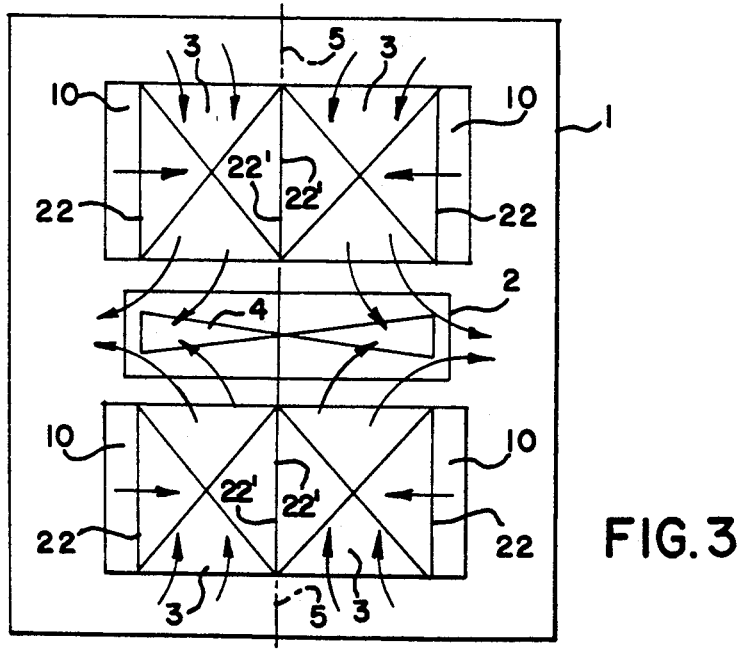
FIG.3

EGG INCUBATION CARRIAGE FOR A VENTILATED INCUBATION ENCLOSURE

CROSS-REFERENCE TO RELATED APPLICATION

This application is a continuation-in-part U.S. patent application Ser. No. 07/262,455, filed on Oct. 25, 1988 now abandoned.

The present invention relates to an egg incubation carriage for a ventilated incubation enclosure.

BACKGROUND OF THE INVENTION

In such carriages, the eggs are generally placed in cradles which are superposed in columns, with the carriage comprising a plurality of juxtaposed columns which are generally assembled in such a manner as to form a wheeled assembly.

In order to obtain proper incubation, the cradles in the various columns are capable of being tilted back and forth in both directions.

During incubation, the cradles are tilted to about 40° to 50°, and they are moved at intervals of one to three hours.

Incubation carriages generally comprise three to five columns each having 10 to 15 stages each of which receives cradles for 100 to 150 eggs to be incubated.

The carriages used in the past have been of the structure shown in FIGS. 1a and 1b, which shows a carriage 10 including a series of superposed egg-receiving cradles 11 disposed in a plurality of columns 13 mounted on a wheeled carriage 14.

The various cradles within a given column are interconnected at each end by risers 15, and the risers 15 are hinged at their top and bottom ends to tiltable crossbars 16 and 17, thereby enabling the assembly to be given the structure of a hinged parallelogram.

The top crossbars 17 are mounted on pivoting shafts 18 which are interconnected by a link 19. Thus, by moving the link 19 in reciprocating translation (arrow 20) it is possible to cause the shafts 18 to pivot together (arrows 20'), with all of the shafts pivoting identically, thereby causing all of the cradles in the carriage to be tilted simultaneously, as shown in FIG. 1b.

As can be seen in FIG. 1b, when the cradles are tilted, the various columns are separated leaving empty passages between the columns.

Such empty passages have the effect of disturbing the ventilation of the carriage: ventilation is performed, in particular, by a turbine system which establishes a pressure reduction, thereby setting up a flow of air through the carriage, with the direction of this air flow being substantially parallel to the shafts 18. When the cradles are all horizontal, the air flow splits up substantially uniformly over the entire mass of eggs to be incubated, whereas when the cradles are in the tilted position, the air flow tends preferentially to occupy the empty passages created between the columns, thereby reducing the ventilation volume passing through the mass of eggs to be incubated which set up a greater head loss through the columns themselves.

The prior art system therefore does not provide uniform and constant ventilation of the mass of eggs while they are being incubated.

One of the objects of the present invention is to remedy this drawback by proposing a carriage structure which maintains uniformity of ventilation through the mass of eggs to be incubated by preventing the columns from separating when the cradles are tilted.

SUMMARY OF THE INVENTION

To this end, according to the present invention, the cradles in two adjacent columns are hinged to a common vertical riser, with the various risers being pivotally connected at their ends to a series of tiltable crossbars which are pivotally connected to one another in series so as to form an assembly which is articulated at each link point of the crossbars to risers, and at each link point of the risers to cradles, with adjacent risers being capable of being displaced in alternation in opposite directions while remaining parallel to one another so as to fold up and spread out the articulated assembly, thereby tilting the cradles, with the cradles tilting in opposite directions in adjacent columns.

In this manner that the cradles can be tilted alternately in opposite directions without splitting up the columns which would establish empty passages between adjacent columns and interfere with proper ventilation of the mass of eggs.

Certain preferred features include:

the alternating motion of the series of risers is provided by a double action actuator whose body is connected to at least one even-numbered riser (or odd-numbered riser) and whose rod is slidably connected to at least one odd-numbered riser (or even-numbered riser as the case may be);

one of the end risers is fixed to the fixed chassis of the carriage;

the end riser fixed to the fixed chassis of the carriage is the riser closest to the fan assembly of the incubation enclosure, such that when the articulated assembly is folded, the mass of eggs is brought together towards the middle of the fan assembly; and the carriage is disposed in such a manner that the planes of the cradles are substantially parallel to the direction of ventilation air flow.

BRIEF DESCRIPTION OF THE DRAWINGS

An embodiment of the invention is described by way of example with reference to the accompanying drawings, in which:

FIG. 2a shows the top half of the structure of a carriage in accordance with the present invention with egg-cradles in a horizontal position;

FIG. 2b shows the bottom half of the invention with egg-cradles in a tilted position;

FIG. 3 is a diagrammatic plan view of an incubation enclosure containing a plurality of incubation carriages such as that shown in FIGS. 2a and 2b;

MORE DETAILED DESCRIPTION

Figure 1A:
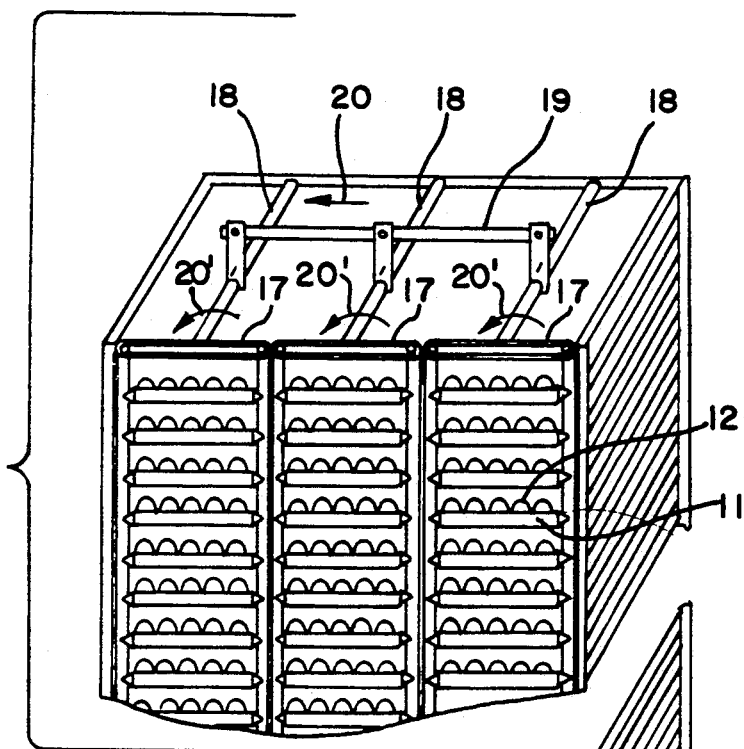
FIG. 1a, as mentioned above, shows the top half of the structure of a prior art carriage with egg-cradles in a horizontal position.

In FIGS. 2a and 2b, a carriage in accordance with the present invention, comprises, in a manner which is conventional per se, cradles 11 receiving eggs 12 to be incubated and disposed in a plurality of columns 13 (e.g., four columns in the embodiment shown), with the assembly being installed on a wheeled chassis 14.

Unlike the prior art carriage, the various cradles of adjacent columns are hinged to common risers 21 (there being three common risers 21 in the four-column embodiment shown), with end risers 22 and 22' also being provided for the end cradles.

This structure provides an assembly which is foldable "concertina-like" without splitting up the mass of eggs, and as shown in FIG. 2b.

The articulated assembly is folded and spread out with alternating motion by means of an actuator 23 whose body 24 is hinged (e.g., at point 25) to an odd-numbered riser (e.g., the third riser, which is the central riser), while its rod 26 is pivotally and slidably attached to a single point 27 on each of the two adjacent even-numbered risers (the second riser and the fourth riser in the example shown), by means of a link 28.

Figure 1B:
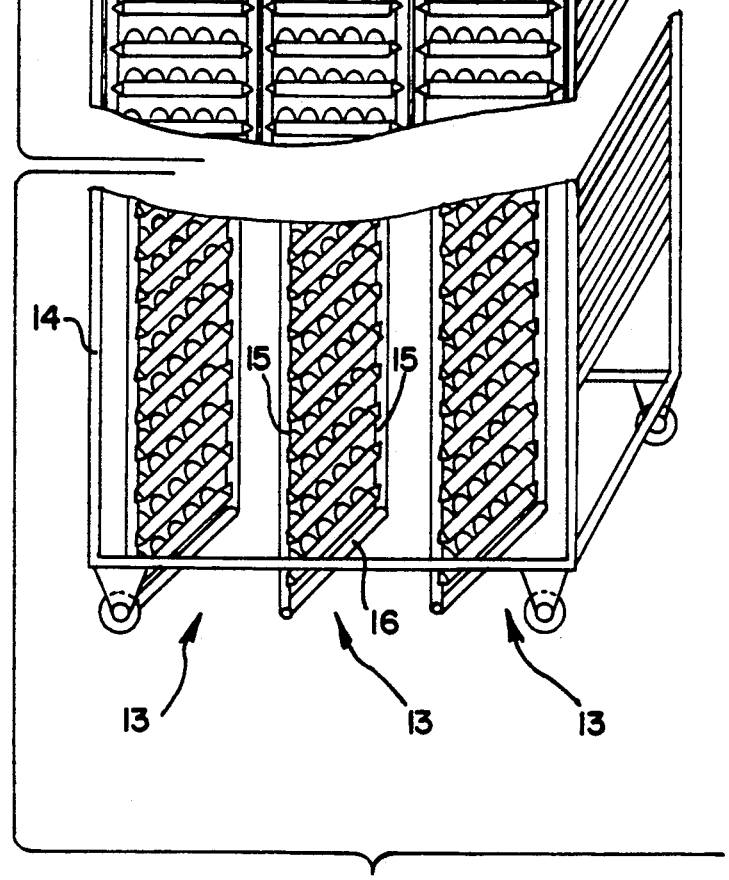
FIG. 1b shows the bottom half of the structure of a prior art carriage with egg-cradles in a tilted position.
Figure 4:
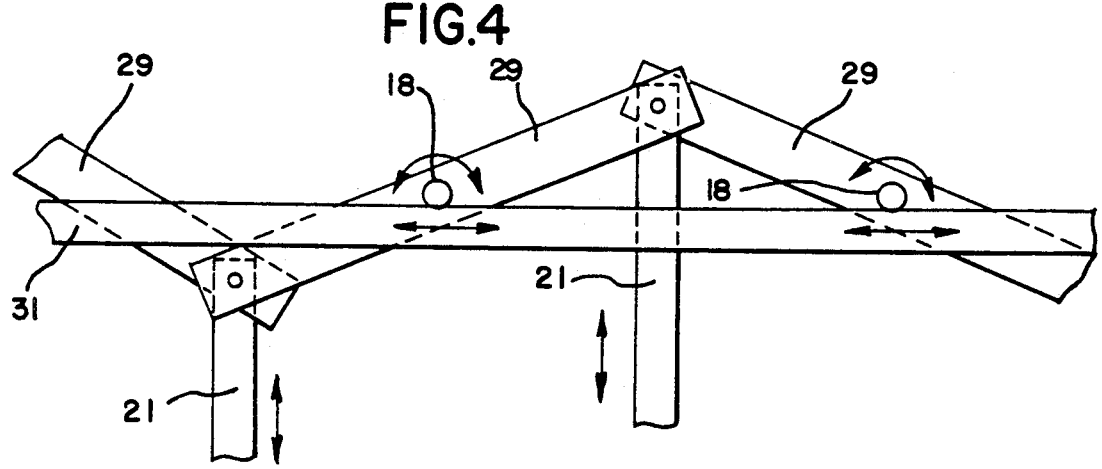
FIG. 4 is a schematic side view of the pivotal relationship between the crossbars and risers in the invention when the egg-cradles are tilted.
Figure 5:
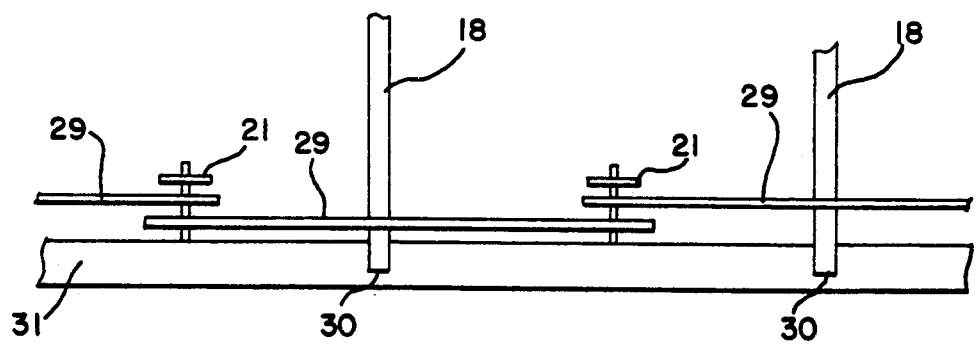
FIG. 5 is a partial top view taken along line 5—5 of FIG. 2a, of the pivotal relationship between the crossbars and risers.

The tops of the risers are pivotally connected to crossbars 29 which are pivotally connected in series with one another (unlike the prior art carriage shown in FIG. 1, where the crossbars were not interconnected at their ends), with the center of each of the crossbars being connected to a shaft 18 as shown in FIGS. 4 and 5. Each crossbar 29 can slide horizontally at the connection point 30 where it engages the shaft 18 (while still allowing it to pivot in a vertical plane) as shown in FIG. 4, by virtue of a horizontal rail 31 which is fixed to the chassis 14 of the carriage.

One of the end risers, e.g., the riser 22', is preferably fixed to the chassis 14 leaving the other end riser (i.e., the riser 22 in this case) free to move relative thereto. This characteristic makes it possible to cause the articulated assembly to fold asymmetrically, with folding taking place towards the riser 22', i.e., as described below, towards the middle of the fan assembly in the incubation enclosure.

FIG. 3 is a diagrammatic plan view showing how items are disposed inside the incubation enclosure.

The enclosure 1 includes a fan assembly 2 placed in a substantially central position and establishing a flow of air inside the enclosure by means of suction, thereby ensuring that the temperature and the humidity are kept uniform throughout the mass of eggs 3 to be incubated.

The incubation carriages 10 are of the type shown in FIGS. 2a and 2b, and four of them are placed in the same enclosure, with two carriages being placed on either side of the fan assembly 2 (said assembly providing symmetrical suction on either side of a turbine 4 and with air being delivered radially).

The carriages 10 in each of the pairs of carriages on one or other side of the fan assembly 2 are disposed the opposite way round to each other, i.e., they are disposed symmetrically about the axis 5 of the turbine such that their respective risers 22' are placed close together.

With this disposition, the mass 3 of eggs to be incubated is always moved together towards the central axis 5 of the ventilating turbine, with the moving risers 22 in each pair of carriages reciprocating simultaneously towards and away from each other.

As a result, the pressure reduction established by the turbine of the fan assembly is used to the full since this effect is more pronounced in the vicinity of the axis 5 than it is towards the edges.

In addition, as mentioned above, the air flows set up by this reduced pressure (with the direction of flow being substantially parallel to the direction of the shafts 18) takes place completely uniformly within the mass of eggs since no empty passage is opened up between the columns, unlike the prior art, with this being because the mass of eggs to be incubated is brought together rather than being split up into separate columns.

I claim:

1. An egg incubation carriage for a ventilated incubation enclosure has egg-receiving cradles which are superposed in columns, said carriage including a plurality of adjacent pairs of juxtaposed columns with the cradles of each column being tiltable in one direction or the other in alternation while remaining parallel with each other, the carriage being disposed in such a manner that the planes of the cradles are substantially parallel to a direction of a ventilation air flow provided by a fan assembly of the incubation enclosure, wherein the cradles of each pair of adjacent columns are hinged to a common vertical riser at respective first link points, said risers being pivotally connected at each of their ends to a respective second link points to one another in series so as to form an assembly which is articulated at each of said first and second link points, with adjacent risers being capable of being displaced in alternation in opposite directions while remaining parallel to one another so as to fold up and spread out the articulated assembly, thereby tilting the cradles, with the cradles tilting in opposite directions in adjacent columns, in such a manner that the cradles can be tilted alternately in opposite directions without splitting up the columns which would establish empty passages between adjacent pairs of columns and interfere with proper ventilation.

2. An egg incubation carriage according to claim 1, wherein the alternating motion of the risers is provided by a double action actuator having a body and a rod, wherein said body is connected to at least one riser and said rod is slidably connected to at least one adjacent riser.

3. An egg incubation carriage according to claim 2, wherein one of the end risers is fixed to a fixed chassis of the carriage.

4. An egg incubation carriage according to claim 3, wherein the end riser fixed to said fixed chassis of the carriage is the riser closest to said fan assembly of the incubation enclosure, such that when the articulated assembly is folded, the eggs are brought together towards the middle of the fan assembly.

* * * * *